United States Patent
Oesterreicher et al.

(10) Patent No.: US 8,548,712 B2
(45) Date of Patent: Oct. 1, 2013

(54) ACCELERATION-BASED SAFETY MONITORING OF A DRIVE OF A MOTOR VEHICLE

(75) Inventors: Florian Oesterreicher, Munich (DE); Juergen Binder, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/467,668

(22) Filed: May 9, 2012

(65) Prior Publication Data

US 2012/0290187 A1    Nov. 15, 2012

(30) Foreign Application Priority Data

May 10, 2011    (DE) .................. 10 2011 075 609

(51) Int. Cl.
G06F 19/00    (2011.01)

(52) U.S. Cl.
USPC .......... 701/99; 701/31.4; 701/37; 701/38; 701/45; 701/65; 701/70; 701/91; 701/96; 701/111; 180/197; 242/374; 280/5.502; 477/120; 477/901; 303/140; 318/139; 318/432; 475/267

(58) Field of Classification Search
USPC .......... 701/1, 31.4, 37, 38, 45, 65, 70, 91, 701/96, 111, 99; 180/197; 242/374; 280/5.502; 477/120, 901; 303/140; 318/139, 318/432; 475/267
See application file for complete search history.

(56) References Cited

U.S. PATENT DOCUMENTS

| | | | |
|---|---|---|---|
| 4,804,058 A | 2/1989 | Leiber et al. | |
| 5,987,372 A | 11/1999 | Wolf et al. | |
| 6,038,503 A | 3/2000 | Wolf et al. | |
| 6,052,642 A | 4/2000 | Wagner et al. | |
| 6,216,082 B1 * | 4/2001 | Minowa et al. ............ | 701/96 |

(Continued)

FOREIGN PATENT DOCUMENTS

| | | |
|---|---|---|
| DE | 36 44 137 A1 | 7/1988 |
| DE | 196 24 822 C1 | 8/1997 |

(Continued)

OTHER PUBLICATIONS

Eller et al., Electric Vehicle Platform for Drivability Analysis, 2010, IEEE, p. 2251-2257.*

(Continued)

*Primary Examiner* — McDieunel Marc
(74) *Attorney, Agent, or Firm* — Crowell & Moring LLP (57) ABSTRACT

An acceleration-based method and device for the safety monitoring of a drive is provided. In the method a setpoint torque is calculated in a safety function as a function of the position of the accelerator pedal. An expected vehicle acceleration is determined, as a function of the setpoint torque, in the safety function. An actual vehicle acceleration is determined, preferably by an acceleration sensor. A fault situation may be detected by comparing the actual vehicle acceleration and the expected vehicle acceleration. A device, preferably included in the vehicle electronics, is configured to implement the acceleration-based method.

13 Claims, 3 Drawing Sheets

(56) References Cited

U.S. PATENT DOCUMENTS

| | | | |
|---|---|---|---|
| 6,622,071 B2 | 9/2003 | Reuter | |
| 8,087,484 B2* | 1/2012 | Seel et al. | 180/65.265 |
| 8,169,173 B2 | 5/2012 | Doerr et al. | |
| 2005/0001481 A1* | 1/2005 | Kley et al. | 303/191 |
| 2007/0173985 A1 | 7/2007 | Thissen et al. | |
| 2009/0132108 A1* | 5/2009 | Seel et al. | 701/22 |
| 2011/0010062 A1* | 1/2011 | Weiss et al. | 701/58 |

FOREIGN PATENT DOCUMENTS

| | | |
|---|---|---|
| DE | 196 24 825 A1 | 1/1998 |
| DE | 196 38 278 A1 | 3/1998 |
| DE | 199 60 782 A1 | 6/2001 |
| DE | 10 2004 027 513 A1 | 12/2005 |
| DE | 10 2004 047 925 A1 | 4/2006 |
| DE | 10 2005 040 783 A1 | 3/2007 |

OTHER PUBLICATIONS

Boris et al., A Comparative Analysis of Electronic Pedal Algorithms Using a Driver-in-the-Loop Simulator and System Identification of Driver, 2010, IEEE, p. 682-687.*

Lomonaco et al., Heuristic Powertrain Setpoint Determination, 2010, IEEE, p. 1-6.*

German Search Report dated Jul. 12, 2011 including partial English-language translation (Ten (10) pages).

* cited by examiner

ACCELERATION-BASED SAFETY MONITORING OF A DRIVE OF A MOTOR VEHICLE

CROSS-REFERENCE TO RELATED APPLICATION

This application claims priority under 35 U.S.C. §119 from German Patent Application No. DE 10 2011 075 609.4, filed May 10, 2011, the entire disclosure of which is herein expressly incorporated by reference.

BACKGROUND AND SUMMARY OF THE INVENTION

The invention relates to the safety monitoring of a drive in a motor vehicle.

Vehicles with a digital electronic engine control module typically have a safety monitoring of the drive, in order to detect fault situations and to initiate suitable countermeasures. Such fault situations can be induced, for example, by an incorrect calculation in the engine control module (in particular, due to a random hardware error) or can be induced by sensor errors.

A safety monitoring function often serves to guarantee a wide range of safety goals. One safety goal is to prevent the vehicle from accelerating contrary to the driver's intention, for example, because the setpoint drive torque deviates significantly from the driver's request on account of a computational error.

In order to control the engine of motor vehicles, it is often the case that the operating function uses a so-called torque structure that is also referred to as a torque controller. The torque structure processes a driver-requested torque that is determined by an accelerator pedal characteristic map. As a function of the torque requested by the driver and the additional torque demands (for example of subassemblies or the transmission control module), a setpoint drive torque (that is, a torque requirement) is calculated for the drive. From the setpoint drive torque the engine control module then determines the desired engine parameters (for example, the ignition angle, quantity of fuel, etc.) by means of the engine functions in order to control the engine.

A conventional concept for preventing an undesired acceleration consists in essence of simply simulating and calculating in parallel the accelerator pedal characteristic map and the torque structure of the operating function in a safety function. Then the results of the parallel calculation in the parallel path are compared with a corresponding variable from the normal path of the vehicle. In the event of deviations that exceed an allowable tolerance, a fault is detected, for example, after a fault clearance time, and a fault reaction is triggered. A suitable fault reaction is, for example, the shutdown of the fuel supply at higher speeds.

Figure 1:
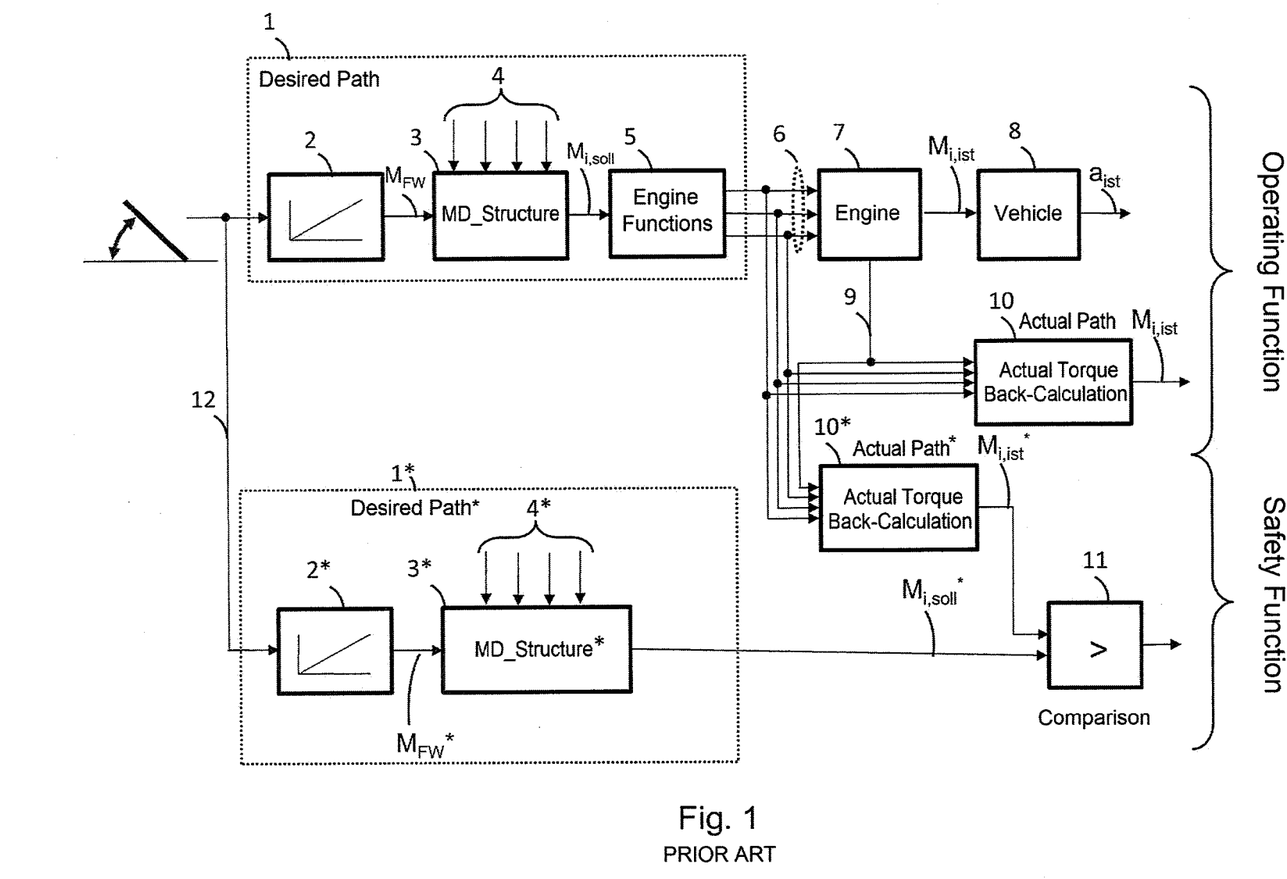
FIG. 1 shows a conventional torque-based safety function for preventing an undesired acceleration.

One example of a conventional torque-based concept of a safety function for preventing an undesired acceleration is shown in FIG. 1. In a desired path 1 of the operating function, an accelerator pedal signal, which indicates the deflection of the accelerator pedal, is converted into a driver-requested torque $M_{FW}$ by an accelerator pedal interpreter 2 (accelerator pedal characteristic map). As an alternative, the driver-requested torque $M_{FW}$ can also be determined by a driver assistance system (for example, a cruise control or an adaptive cruise control). In the torque structure 3 a setpoint drive torque $M_{i,soll}$ is calculated from the driver-requested torque $M_{FW}$ taking into consideration various torque demands 4 (for example, the torque demands of the transmission, the vehicle dynamic control, the speed control or the subassemblies).

The actuator setpoint values 6 of the engine (for example, the ignition angle, fuel quantity, air mass, etc.) are calculated from the setpoint drive torque $M_{i,soll}$ by way of the engine functions 5. The desired engine parameters 6 serve to control the engine 7. The engine 7 generates an actual drive torque $M_{i,ist}$, from which an actual acceleration $a_{ist}$ is calculated by way of the vehicle. The actual drive torque $M_{i,ist}$ is back-calculated by sensors at the engine by means of a dedicated module in the computing block 10 as a function of the actuator setpoint values 6 (or the actuator actual values) and as a function of the signal values 9, because typically there is no torque sensor to measure directly the actual drive torque $M_{i,ist}$.

The safety function has a simulation 1* of the desired path 1 up to the torque structure 3. The simulated desired path 1* comprises a simulation 2* of the accelerator pedal characteristic map 2 and a simulation 3* of the torque structure 3. Furthermore, there is a simulation 10* of the actual torque back-calculation 10. The simulations typically involve simplified simulations that calculate with less accuracy, but, therefore, are, in particular, validated.

The back-calculated actual drive torque $M_{i,ist}*$ and the setpoint drive torque $M_{i,soll}*$, which is calculated in the safety function, are compared in a comparison block 11, and in the event of a defined deviation from $M_{i,ist}*$ and $M_{i,soll}*$ after a defined fault clearance time, a fault is detected and a suitable fault reaction is triggered.

The object of the present invention is to provide an alternative concept to those described above in order to monitor the safety of a drive.

This engineering object is achieved by the method and apparatus disclosed herein.

A first aspect of the invention relates to an acceleration-based method for the safety monitoring of a drive. In this method a setpoint torque is calculated in a safety function as a function of a characteristic accelerator pedal signal for the position of the accelerator pedal.

As an alternative, the setpoint torque can also be determined as a function of a signal (for example, of a setpoint torque) of a driver assistance system (for example of a cruise control or an adaptive cruise control) that influences the longitudinal movement of the vehicle. An expected vehicle acceleration is determined, as a function of the setpoint torque, in the safety function. In addition, an actual vehicle acceleration is determined, for example, by an acceleration sensor or by differentiating a speed (for example, the rotational speed of the wheels). A fault situation can be detected by comparing the actual vehicle acceleration with the expected vehicle acceleration, for example, when the actual vehicle acceleration exceeds the expected vehicle acceleration by a certain amount (and optionally for a defined fault clearance time).

Then in a fault situation a suitable fault reaction is triggered. For example, the speed may be limited, as a fault reaction, in particular, by preventing the injection of fuel above a specified speed threshold.

The above-described concept has the advantage that there is no need for a simulation of the back-calculation of the actual drive torque, because the comparison takes place on the basis of the acceleration signals. This approach makes it possible to significantly reduce the functional scope of the safety function and, as a result, cuts the costs for the implementation and validation.

Preferably no additional torque demands are considered in the safety function in the direction of the signal after the simulation of the accelerator pedal interpreter, and a torque structure that is present in the operating function and located in the desired path is dispensed with in the safety function. The driver-requested torque generated by the accelerator pedal interpreter is converted preferably directly into a vehicle acceleration (but, for example, a braking torque can still be considered beforehand), so that the driver-requested torque is not changed prior to the conversion into a vehicle acceleration due to additional torque demands. This simplification is based on the knowledge that each of the additional torque demands, such as the intervention of an engine drag torque control that increases the setpoint torque, should be designed in such a way that this intervention does not result in a violation of the safety goal. Despite the possibility of an increase in torque, such a torque demand does not usually result in a noticeable increase in the measurable actual vehicle acceleration and can, therefore, be left out of account in the signal path for determining the expected vehicle acceleration.

The elimination of the torque demands in the safety function makes it possible to significantly reduce the functional scope of the safety function, so that the result is a cost reduction during implementation and validation. In addition, such an elimination allows the safety function to be independent of the operating function that is used for a specific purpose. Changes in the torque structure of the operating function do not require any commensurate changes in the safety function, so that the effort and cost incurred in the implementation and validation of the changes can be reduced. In addition, by decreasing the need to make changes in the safety function there is also less of a risk that a change in the safety function could cause a fault that could have a negative impact on the safety or the availability of the system. The independence of the safety function enables the broad use of the safety function. As a result, the function is subjected to intensive testing that will improve the robustness and reliability.

As an alternative, it can also be provided that one or more additional torque demands are considered in the safety function in the signal direction after the simulation of the accelerator pedal interpreter. However, not all torque demands of the operating function are also considered in the safety function. For example, only the intervention of an electronic transmission control module is considered in the safety function; other torque demands, which are considered in the operating function, are not considered in the safety function. According to an advantageous embodiment, the setpoint torque is determined not only as a function of an accelerator pedal signal, but also as a function of a service brake-based brake signal. Preferably a braking torque, which acts on the service brake, is used for this purpose. For example, prior to the calculation of the setpoint acceleration the braking torque is superposed with a torque request, delivered by the accelerator pedal interpreter, in the signal direction in the safety function. If a brake signal is considered in the safety function, then it is possible to detect, for example, the fault case that the drive torque of the engine is too high owing to a fault and that the driver is endeavoring to compensate for this fault by applying the brake. If the brake information is considered, then it can be detected if the actual vehicle acceleration is inadmissibly high during a braking action. In addition, by considering the braking torque it is possible to monitor whether the actual delay of the vehicle at the current braking torque is inadmissibly large.

The actual vehicle acceleration can be calculated, for example, by differentiating a wheel rotational speed. However, this procedure has the drawback that the actual vehicle acceleration also comprises, depending on the degree of climb, a corresponding component that can be attributed to the climbing resistance. In order to compensate for this climbing resistance, a climb signal has to be considered when determining the actual vehicle acceleration, a feature that is associated with additional effort and costs. In order to eliminate this disadvantage, the actual vehicle acceleration is determined preferably with the use of a signal of at least one acceleration sensor. Thus, there is no need to include a climb signal in the calculation. Owing to the physical measuring principle of such an acceleration sensor, only a driving or delaying actual acceleration, which is not caused by the climb, is outputted by the sensor. Acceleration sensors belong to the group of inertial sensors and measure the acceleration, which is caused by an initial force acting on a test mass.

For example, in the case of a vehicle standing in a firmly braked manner on a slope, an acceleration sensor shows the gravitational acceleration component in the direction of the slope—that is, $a = g \cdot \sin \alpha$ at the acceleration due to gravity g and the inclination $\alpha$ of the slope. This matches, according to $F = m \cdot a$ (ignoring the friction), exactly the force that acts in the longitudinal direction on the vehicle and is necessary to hold the vehicle. If, however, the vehicle is not firmly braked and rolls down the slope without drive, then in participle no acceleration is indicated. Consequently the measuring principle determines precisely the acceleration that is caused by driving or braking, but not caused by the slope descending force.

It is advantageous that, in addition to the actual vehicle-longitudinal acceleration, the influence of the moments of inertia of the drive and/or the wheels during a change in speed is also considered—for example, the moments of inertia of two wheels of the engine driven axle (or all four wheels), of the engine and/or of the crankshaft. Thus, it is possible, for example, to detect an engine torque that is set incorrectly too high when there is insufficient contact with a road surface at a low coefficient of friction, even though the vehicle does not show an obvious increase in the vehicle-longitudinal acceleration owing to the spinning wheels. Preferably in this case a torque and/or a corresponding rotationally acting acceleration—both of which are caused by the moments of inertia of the drive and/or one or more wheels—are/is calculated.

For example, the actual vehicle acceleration is determined as a function of the actual vehicle-longitudinal acceleration (which is determined, in particular, by an acceleration sensor) and as a function of an actual acceleration due to the inertia of the drive and/or wheels. For example, in order to calculate the actual vehicle acceleration, the actual vehicle-longitudinal acceleration and the actual acceleration due to the inertia of the drive and/or the wheels are added. As an alternative to the consideration in the actual path, the actual acceleration can be considered owing to the inertia of the drive and/or wheels in the desired path of the safety function, in which the expected acceleration is determined (and in this case it is then subtracted).

In addition to the longitudinal acceleration, the transverse acceleration can also be considered, in order to compensate for the sensor errors of an acceleration sensor, in order to determine the longitudinal acceleration at a high float angle.

The safety monitoring provides that the expected vehicle acceleration and the actual vehicle acceleration are compared with each other. The actual vehicle acceleration can be derived from the vehicle-longitudinal acceleration and optionally an acceleration due to the inertia of the drive and/or the wheels.

The comparison typically takes place in the direction of too high an acceleration. It is checked whether the actual vehicle acceleration exceeds the expected vehicle acceleration in a defined way—for example, whether the actual vehicle acceleration deviates upwards from the expected vehicle acceleration by more than a defined specified tolerance—for example, by 1.5 m/s². The specified tolerance may not be constant and can depend on the operating point—for example, on the value of the accelerator pedal signal and/or the brake signal.

Preferably the comparison also takes place in the direction of too high a delay, in order to cover the safety goal of the undesired delay. For this purpose it is checked whether the actual vehicle acceleration drops below the expected vehicle acceleration in a defined way—for example, whether the actual vehicle acceleration deviates downwards from the expected vehicle acceleration by more than a defined fixed (for example, by 1.5 m/s²) or variable specified tolerance. The specified tolerance may increase, for example, over a subrange of the accelerator pedal signal in the same way as the expected acceleration as the accelerator pedal application increases.

An advantageous embodiment of the safety monitoring function provides that the absence of the frictional connection in the drive train is detected. A frictional connection in the drive train is not present, for example, if the clutch is actuated or no gear is engaged. On detection of the absence of the frictional connection, the safety function can be deactivated, for example, by deactivating the fault detection or a fault reaction (for example, for a defined period of time). It can also be provided that the tolerance of the safety monitoring is increased—for example, the tolerance of the fault detection is increased. This expansion serves the purpose of avoiding a fault detection or fault reaction in such an improper case as the acceleration of the vehicle due to a force outside the vehicle—for example, when the vehicle is being towed or when the vehicle moves in a car wash.

Preferably a tow start detection is provided. Tow start is defined herein as the movement of the vehicle by forces outside the vehicle for the purpose of starting an internal combustion engine—for example, by towing with a second vehicle. On detection of the tow start, the safety monitoring can be deactivated or the tolerance of the safety monitoring can be increased, for example, for a defined period of time. In order to detect a tow start, the vehicle speed (or the wheel rotational speed), the engine speed and the actuation of the start device can be evaluated. A tow start is detected, for example, by the increase in the engine speed, starting from a zero speed without actuation of a starter. To this end it can be checked, for example, whether a self-running threshold (below the idle speed) has been reached or exceeded, starting from a zero speed.

A second aspect of the invention relates to a device for safety monitoring. This device can be a part of an electronic engine control module. The safety monitoring device comprises hardware and/or software such as a suitably programmed control module, for determining a setpoint torque as a function of a characteristic accelerator pedal signal for the position of the accelerator pedal. Furthermore, the safety monitoring device determines an expected vehicle acceleration as a function of the setpoint torque. In addition, the device determines (or only considers) an actual vehicle acceleration. An acceleration sensor can be used to determine the actual vehicle acceleration. Furthermore, the device detects a fault situation in that the actual vehicle acceleration is compared with the expected vehicle acceleration.

The above embodiments of the inventive method according to the first aspect of the invention also apply in a corresponding way to the inventive device according to the second aspect of the invention.

Other objects, advantages and novel features of the present invention will become apparent from the following detailed description of one or more preferred embodiments when considered in conjunction with the accompanying drawings.

DETAILED DESCRIPTION OF THE DRAWINGS

FIG. 1 shows one example of a conventional torque-based safety function that has already been discussed above.

Figure 2:
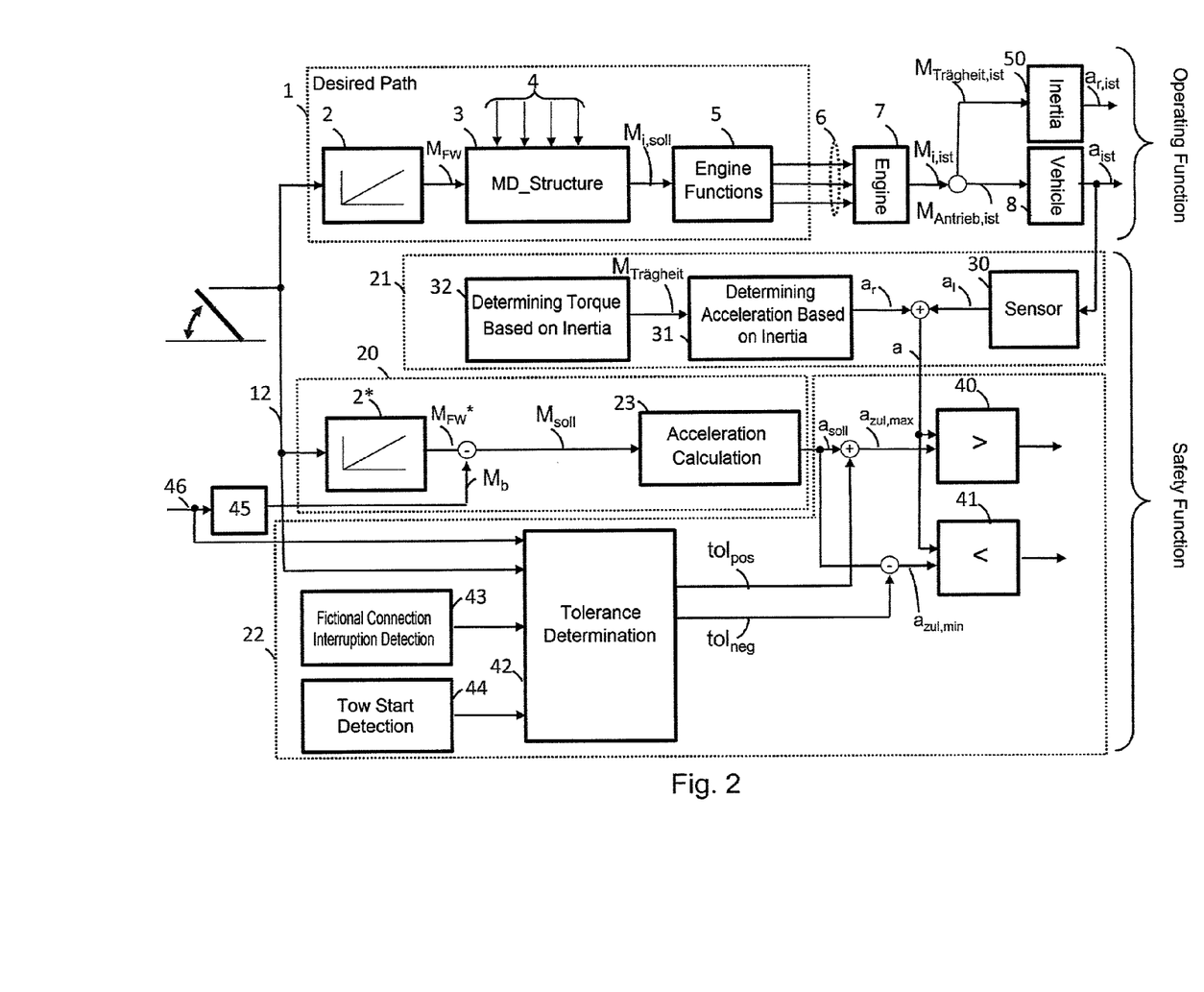
FIG. 2 shows a first embodiment of an acceleration-based safety function according to the invention for the purpose of preventing an undesired acceleration.

FIG. 2 shows an embodiment of an acceleration-based safety function according to the invention for the purpose of preventing an undesired acceleration. Signals and blocks bearing the same reference numerals and symbols in FIG. 1 and FIG. 2 are identical.

Figure 3:
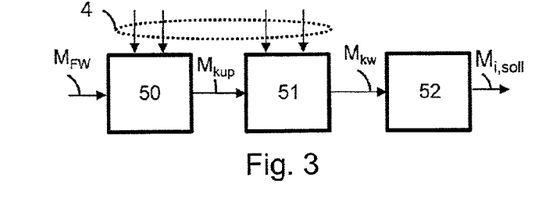
FIG. 3 is an embodiment of a torque structure according to the invention.

In the example shown in FIG. 2, any torque structure 3 can be used in the desired path 1 of the operating function. However, preference is given to a torque structure 3 that processes a wheel torque, based on one or more wheels, as the driver-requested torque $M_{FW}$—for example, the common torque of all of the driven wheels (in the case of a standard drive two wheels, in the case of an all-wheel drive four wheels). One example is shown in FIG. 3. The torque structure 3 comprises a power train model 50, which determines a clutch torque $M_{kup}$ as a function of the torque demands 4 (for example, due to a transmission intervention). The next block 51 considers the torque demands 4 of the subassemblies (for example, the air conditioner compressor) and calculates a crankshaft-based torque $M_{kw}$. A friction model 52 of the engine calculates an internal engine torque $M_{i,soll}$ from the crankshaft-based torque $M_{kw}$; and the actuator setting parameters 6 of the engine are determined from said internal engine torque $M_{i,soll}$.

The safety function shown in FIG. 2 comprises a desired path 20 for determining an expected vehicle acceleration $a_{soll}$ as a function of a characteristic accelerator pedal signal 12 for the position of the accelerator pedal. Furthermore, there is an actual path 21 for determining an actual vehicle acceleration a, and there is a comparison block 22 for comparing the actual vehicle acceleration a and the expected vehicle acceleration $a_{soll}$.

Desired Path 20

The safety function shown in FIG. 2 comprises a desired path 20, which determines a total drive request torque $M_{soll}$ (setpoint torque) of the vehicle from the accelerator pedal signal 12 or an alternative signal (not shown) for a request by a driver (like the signal of a cruise control or an adaptive cruise control). In this case an accelerator pedal interpreter 2* determines a driver-requested torque $M_{FW}$ as a function of the accelerator pedal signal 12. The driver-requested torque $M_{FW}$ is preferably a wheel-based torque—for example, the common drive torque of all of the driven wheels (in the case of a standard drive two wheels, in the case of an all-wheel drive four wheels).

Preferably the braking torque $M_b$ that acts on the service brake is considered in determining the setpoint torque $M_{soll}$. In this case the braking torque $M_b$ is subtracted from the driver-requested torque $M_{FW}$ in order to determine the setpoint torque $M_{soll}$ (an addition with a negative braking torque is also equivalent to a subtraction). This feature allows the application of the safety function to be expanded to include even the braking case. For example, it is possible to detect the fault situation that causes too high an engine torque because of a fault, and the driver tries to compensate for this increase by applying the brake pedal. The braking torque $M_b$ is determined as a function of a brake pedal signal 46 in block 45.

Preferably the time-delayed action of the torque build-up on releasing the accelerator pedal is simulated in the desired path 20 in that the setpoint torque $M_{soll}$ is time-delayed with a suitable filter (not illustrated). In addition, the time-delayed action of the torque build-up could also be simulated.

At variance with the conventional safety functions and in contrast to the desired path 1 of the operating function, no preference is given to the consideration of additional torque demands (see the torque demands 4 in the desired path 1) in the desired path 20, because each of the additional torque interventions, such as a torque-increasing transmission intervention during a gear shift or a torque-increasing intervention of a vehicle stabilization system, should be configured preferably in such a way that this intervention does not result in a violation of the safety goal of an undesired acceleration. Therefore, the torque structure 3 can be eliminated in the safety function or at least significantly reduced in its scope (for example, only the torque demand 4 of the transmission can be considered). Not only is there no need for the power train model 50, shown in FIG. 3, and the block 51, which is provided for considering the torque demands of subassemblies, in the safety function, but it is also possible to dispense with the friction model 52 of the engine for calculating an internal engine torque in the safety function. Since the accelerator pedal characteristic map of the accelerator pedal interpreter 2* delivers preferably the driver request $M_{FW}$* as a wheel-based torque (instead of, as a torque, for example, at the crankshaft), the vehicle acceleration $a_{soll}$ can be easily calculated from the wheel torque $M_{FW}$*, without having to convert the driver-requested torque only at the reference point of the wheels.

This simplification makes it possible to significantly reduce the functional scope of the safety function and at the same time cut costs during the implementation and validation. In addition, this simplification allows the safety function to be independent of the operating function, so that the rate of change in the safety function is reduced.

In block 23 the setpoint torque $M_{soll}$ is converted into an expected acceleration $a_{soll}$. For example, the setpoint torque $M_{soll}$ is converted into a desired longitudinal force, acting on the vehicle, by the wheel radius. From this desired longitudinal force a level road resistance force is subtracted, which simulates, for example, the air resistance and the frictional resistance. The level road resistance force is determined, for example, as a function of the vehicle speed.

The acceleration is calculated, for example, from the quotient of the resulting longitudinal force (desired longitudinal force minus the level road resistance force) and a vehicle mass. At the same time it is also possible to work, for example, with a worst case vehicle mass. For example, a minimum vehicle mass and/or a maximum vehicle mass can be used for the calculation.

Actual Path 21

An actual vehicle acceleration a is determined in the actual path 1. A vehicle acceleration can be calculated, for example, by differentiating the rotational speed of the wheels, for example, by differentiating the wheels that are not connected to the drive. However, this procedure has the drawback that the vehicle acceleration also comprises, depending on the degree of climb, a corresponding component that can be attributed to the climbing resistance. In order to compensate for this climbing resistance, a climb signal has to be considered in the course of determining the vehicle acceleration, a feature that is associated with additional effort and costs. In order to eliminate this disadvantage, the vehicle acceleration is determined preferably with the use of an acceleration sensor 30, which determines the longitudinal acceleration $a_l$ of the motor vehicle. Since a climb-induced acceleration component is not outputted by the sensor 30, there is no need to include a climbing signal in the calculation.

Preferably, in addition to the longitudinal acceleration of the vehicle, the influence of the moments of inertia of the drive and/or the wheels during a change in speed is also considered. FIG. 2 shows that the torque $M_{i,ist}$ of the engine 7 comprises a component $M_{Antrieb,ist}$, which is used for the (longitudinal) acceleration of the vehicle 8, and a dynamic component $M_{Trägheit,ist}$, which affects a rotationally acting acceleration $a_{r,ist}$ of the moments of inertia 50 of the drive and/or the wheels. A dynamic component $M_{Trägheit}$ and/or a corresponding acceleration $a_r$, both of which are caused by the inertia 50 of the drive and/or the wheels, can be calculated in the following manner.

$$a = F/m_{FZG}$$

$$a = (M \cdot r_{Rad})/m_{FZG}$$

where $M = M_{Antrieb} + M_{Trägheit}$ $$a = a_l + a_r = [(M_{Antrieb} \cdot r_{Rad})/m_{FZG}] + [(M_{Trägheit} \cdot r_{Rad})/m_{FZG}]$$

$$M_{Trägheit} = J_{Gesamt} \cdot \omega$$

$$M_{Trägheit} = |^{kmax}\Sigma_{K=1} J_{Rad(K)} 2\pi \cdot [dn(k)/dt] + J_{Mot} \cdot i^2 \cdot 2\pi \cdot (dn/dt)]$$

In this case $m_{FZG}$ describes the vehicle mass, $J_{Gesamt}$ the moment of inertia of the drive and the wheels, $J_{Rad(k)}$, the moment of inertia of the $k^{th}$ wheel, n(k), the rotational speed of the $k^{th}$ wheel, n, the engine speed, $J_{Mot}$, the moment of inertia of the drive (for example, the engine and the crankshaft), and i describes the total transmission ratio of the crankshaft up to the wheel. The variable kmax describes the number of wheels considered (2 or 4 wheels).

In block 32 the dynamic torque $M_{Trägheit}$ is calculated, according to the above equation, on the basis of the inertia of the drive and/or the wheels during a speed change. In block 31 the corresponding acceleration $a_r$ is calculated, as stated above, from the torque $M_{Trägheit}$. In order to determine the acceleration a, the rotationally acting acceleration $a_r$ of the moments of inertia and the longitudinal acceleration $a_l$ are added.

It must be pointed out that in order to consider the influence of the moment of inertia of the drive and/or the wheels in the event of a change in speed, it is not mandatory that the corresponding acceleration $a_r$ be calculated. For example, the influence of the moment of inertia can also be considered by just calculating a corresponding torque without actually calculating the corresponding torque (see below).

The consideration of the moment of inertia of the drive and/or the wheels makes it possible to detect a fault situation with an engine torque that is set too high in the event that the longitudinal acceleration $a_l$ is small or not present (for example, in the case of insufficient contact with the level road surface at a low coefficient of friction) or in the event that the longitudinal acceleration is high and there is insufficient contact with the road surface. If without taking into consideration the inertia when the engine torque is set incorrectly too high and there is simultaneously insufficient contact with the road surface, no longitudinal acceleration $a_l$ or only a small longitudinal acceleration is measured, then the safety function does not intervene, and the fault is not detected. In contrast, when the inertia is considered, in such a case an unusually high acceleration $a_r$ is detected that is significantly higher than the expected acceleration $a_{soll}$. In FIG. 2 the longitudinal acceleration $a_l$ has been calculated preferably with an acceleration sensor, instead of differentiating the rotational speed of the driven wheels. In addition, the influence of the moment of inertia is calculated. As a result, the safety function is sensitive both with respect to the longitudinal acceleration of the vehicle and also with respect to the acceleration owing to the inertia of the drive and/or the wheels.

In FIG. 2 the influence of the inertia of the drive and/or the wheels during a change in speed is considered in the actual path 21. In this case the corresponding acceleration $a_r$ is added to the longitudinal acceleration $a_l$. Instead, it is also possible to consider the influence of the inertia in the desired path 20. For example, an acceleration $a_r$, induced by the inertia, can be subtracted from the setpoint acceleration $a_{soll}$; or the torque $M_{Trägheit}$ can be subtracted from the torque $M_{soll}$.

It is also possible to determine the transverse acceleration (not illustrated) (for example, by an additional acceleration sensor). This feature allows the correction of a sensor error of the longitudinal acceleration sensor 30 at a high float angle or high transverse acceleration. For example, the longitudinal acceleration $a_l$ can be corrected, as a function of the transverse acceleration, for example, by a characteristic map that delivers, as a function of the transverse acceleration, a correction value (in particular, an additive correction value) for the longitudinal acceleration. As an alternative, the tolerance of the safety function can also be increased as a function of the transverse acceleration.

Comparison Block 22

In the comparison block 22 the expected acceleration $a_{soll}$, which is determined in the desired path 20, is compared with the actual acceleration a, which is determined in the actual path 21.

The comparison block 22 is configured to detect an undesired increase in the actual acceleration a by means of comparison. It is checked whether the actual vehicle acceleration a exceeds the expected vehicle acceleration $a_{soll}$ by more than a defined tolerance value $tol_{pos}$ (for example, 1.5 m/s$^2$).

For this purpose a maximum allowable vehicle acceleration $a_{zul,max}$ is determined by adding the expected vehicle acceleration $a_{soll}$ and the tolerance value $tol_{pos}$. The comparison operation 40 is used to check whether the actual vehicle acceleration a is greater than the maximum allowable vehicle acceleration $a_{zul,max}$. If this is the case, then a fault is detected (the output signal of block 40 goes, for example, to the binary value +1), and a corresponding fault reaction is triggered.

In addition, the comparison block 22 is configured optionally to detect by comparison an undesired decrease in the actual acceleration a, in order to cover the safety goal of an undesired delay. It is checked whether the actual vehicle acceleration a drops below the expected vehicle acceleration $a_{soll}$ by more than a defined tolerance value $tol_{neg}$ (for example, 1.5 m/s$^2$). In addition, a minimum allowable vehicle acceleration $a_{zul,min}$ is determined by subtracting the tolerance value $tol_{neg}$ from the expected vehicle acceleration $a_{soll}$. The comparison operation 41 is used to check whether the actual vehicle acceleration a is less than the minimum allowable vehicle acceleration $a_{zul,max}$. If this is the case, then a fault is detected (the output signal of block 41 goes, for example, to the binary value +1), and a corresponding fault reaction is triggered.

In principle, the tolerance values $tol_{pos}$, $tol_{neg}$ can be constant. However, in FIG. 2 the tolerance values are preferably variable and depend, for example, on the operating point—for example, on the value of the accelerator pedal signal 12 and/or on the value of the brake pedal signal 46. In addition, the tolerance values $tol_{pos}$, $tol_{neg}$ are determined as a function of the accelerator pedal signal and the brake signal $M_b$ in block 42.

Furthermore, the tolerance values $tol_{pos}$, $tol_{neg}$ can be optionally significantly higher in certain situations, so that the safety function does not respond incorrectly.

To this end there is, for example, a block 43 that detects the absence of the frictional connection in the drive train, for example, during disengagement or non-engagement of the gear. On detection of the absence of the frictional connection, block 42 then expands the fault tolerance for detecting a fault (that is, the tolerance values $tol_{pos}$, $tol_{neg}$ are significantly increased). This strategy serves the purpose of avoiding a fault reaction in such an improper case as the acceleration of the vehicle due to a force outside the vehicle—for example, when the vehicle is being towed or when the vehicle moves in a car wash.

Preferably a tow start detection 44 is also provided. In order to detect a tow start, the vehicle speed (or the wheel rotational speed), the engine speed and the actuation of the start device can be evaluated. A tow start is detected, for example, by the increase in the engine speed, starting from a zero speed without actuation of a starter. On detection of a tow start situation, the fault tolerance for detecting a fault is then expanded for a defined period of time (that is, the tolerance values $tol_{pos}$, $tol_{neg}$ are significantly increased).

The embodiment shown in FIG. 2 can be simplified by dispensing, for example, with
   the frictional connection interruption detection 43,
   the tow start detection 44,
   the comparison block 41 and the tolerance value $tol_{neg}$,
   the determination of the rotational acceleration $a_r$ in block 31 and/or
   the consideration of the braking torque $M_b$ in determining the setpoint torque.

Figure 4:
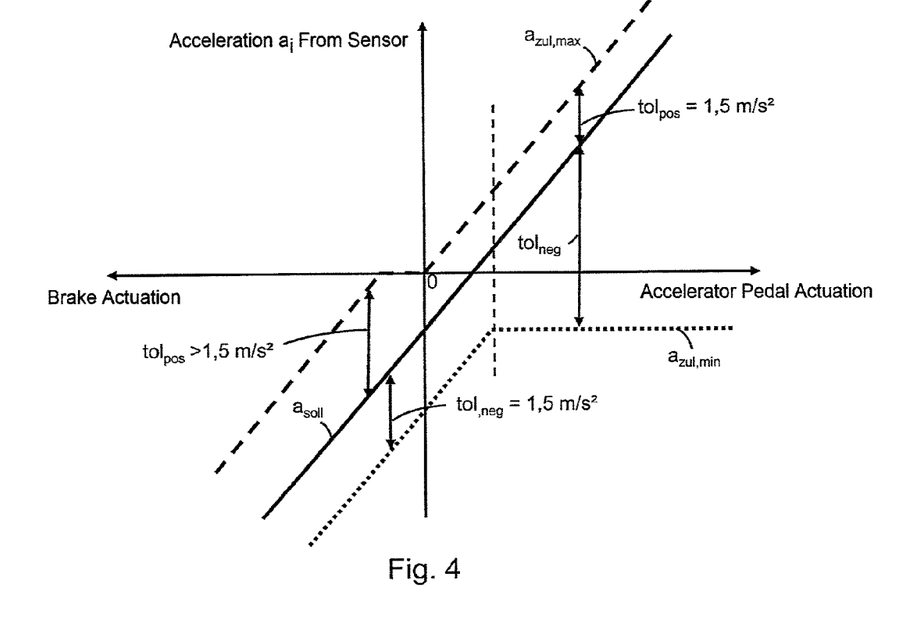
FIG. 4 shows profiles of the expected acceleration, the maximum allowable acceleration and the minimum allowable acceleration.

FIG. 4 shows an example profile of the expected acceleration $a_{soll}$ as a function of the application of the accelerator pedal and the brake. In addition, the figure shows an example profile of the maximum allowable acceleration $a_{zul,max}$, and the minimum allowable acceleration $a_{zul,min}$ that is found by adding the specified tolerance $tol_{pos}$ or by subtracting the specified tolerance $tol_{neg}$. Both specified tolerances $tol_{pos}$ and $tol_{neg}$ are not constant over the entire operating range, but rather are variable. The minimum allowable acceleration $a_{zul,min}$ is used for delay monitoring. The upper limit of the minimum allowable acceleration $a_{zul,min}$ corresponds, for example, to the acceleration in overrun mode with a drag torque. The specified tolerance $tol_{neg}$ decreases, beginning at the dashed perpendicular line, with increasing accelerator pedal application in the same way as the expected acceleration $a_{soll}$, so that the result for this subrange is a fixed minimum allowable acceleration $a_{zul,min}$.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for safety monitoring of a drive in a motor vehicle, comprising the acts of:
   determining by a processor a setpoint torque as a function of at least one of a characteristic accelerator pedal signal for a position of an accelerator pedal and a signal of a driver assistance system influencing a vehicle-longitudinal movement;
   determining by the processor an expected vehicle acceleration as a function of the setpoint torque;
   determining by the processor an actual vehicle acceleration; and
   detecting a fault situation by comparing the actual vehicle acceleration and the expected vehicle acceleration.

2. The method as claimed in claim 1, wherein the setpoint torque is determined as a function of a brake signal based of a service brake of the motor vehicle as a function of a braking torque acting on the service brake.

3. The method as claimed in claim 1, wherein the actual vehicle acceleration is determined with an acceleration sensor.

4. The method as claimed in claim 1, wherein the influence of moments of inertia of at least one of the drive and one or more wheels during a change in speed is considered.

5. The method as claimed in claim 4, wherein at least one of a torque and an acceleration is calculated, and
   said at least one of torque and acceleration is generated by the moments of inertia of the at least one of the drive and one or more of the wheels.

6. The method as claimed in claim 1, wherein the comparing acts includes:
   checking whether the actual vehicle acceleration exceeds the expected vehicle acceleration in a pre-defined way, and
   checking whether the actual vehicle acceleration drops below the expected vehicle acceleration in a pre-defined way.

7. The method as claimed in claim 1, further comprising the acts of:
   detecting an absence of a frictional connection in the drive; and
   on detection of the absence of the frictional connection, deactivating the safety monitoring or increasing a tolerance of the safety monitoring.

8. The method as claimed in claim 1, further comprising the acts of:
   detecting a tow start of the motor vehicle; and
   on detection of the tow start of the motor vehicle, deactivating the safety monitoring or increasing a tolerance of the safety monitoring.

9. The method as claimed in claim 8, wherein the tow start of the motor vehicle is detected by an increase in engine speed, starting from a zero speed, without actuation of a starter.

10. The method as claimed in claim 1, wherein an accelerator pedal interpreter determines the setpoint torque, and no torque demands are considered on an output side of the accelerator pedal interpreter until calculation of the expected acceleration.

11. The method as claimed in claim 1, wherein
    an accelerator pedal interpreter determines the setpoint torque; and
    the accelerator pedal interpreter determines a wheel-based driver-requested torque, based on one or more wheels.

12. A device for safety monitoring of a drive in a motor vehicle, comprising:
    means for determining a setpoint torque as a function of at least one of a characteristic accelerator pedal signal for the position of the accelerator pedal and a signal of a driver assistance system influencing the vehicle-longitudinal movement;
    means for determining an expected vehicle acceleration as a function of the setpoint torque;
    means for determining an actual vehicle acceleration; and
    means for detecting a fault situation by comparing the actual vehicle acceleration and the expected vehicle acceleration.

13. A device for safety monitoring of a drive in a motor vehicle, comprising:
    a control module, the control module being configured to:
        determine a setpoint torque as a function of at least one of a characteristic accelerator pedal signal for a position of an accelerator pedal and a signal of a driver assistance system influencing a vehicle-longitudinal movement;
        determine an expected vehicle acceleration as a function of the setpoint torque;
        determine an actual vehicle acceleration; and
        detect a fault situation by comparing the actual vehicle acceleration and the expected vehicle acceleration.

* * * * *